United States Patent [19]

Petersen

[11] 4,373,940

[45] Feb. 15, 1983

[54] AIR PRECLEANER FOR INTERNAL COMBUSTION ENGINE

[75] Inventor: Ross K. Petersen, Burleson, Tex.

[73] Assignee: Medalie Manufacturing Co., Minneapolis, Minn.

[21] Appl. No.: 343,895

[22] Filed: Jan. 29, 1982

[51] Int. Cl.³ .............................................. B01D 45/12
[52] U.S. Cl. ..................................... 55/328; 55/385 B; 55/398; 55/404; 55/430; 55/457; 55/418; 55/DIG. 37
[58] Field of Search ...................... 55/385 B, 398, 399, 55/430, 431, 457, 404, 317–319, 418, 328, DIG. 37

[56] References Cited

U.S. PATENT DOCUMENTS

| | | | |
|---|---|---|---|
| 2,267,706 | 12/1941 | Baile et al. ............................ | 183/21 |
| 2,670,055 | 2/1954 | Dorman et al. ...................... | 183/80 |
| 3,444,672 | 5/1969 | Alsobrooks .......................... | 55/306 |
| 3,670,480 | 6/1972 | Petersen .............................. | 55/430 |
| 3,757,751 | 9/1973 | Kitchin et al. ...................... | 123/119 |
| 3,792,573 | 2/1974 | Borsheim ............................. | 55/337 |
| 3,853,518 | 12/1974 | Tu et al. ............................... | 55/337 |
| 3,920,426 | 11/1975 | Tu et al. ............................... | 55/337 |
| 3,951,627 | 4/1976 | Barr et al. ............................ | 55/284 |
| 3,973,937 | 8/1976 | Petersen .............................. | 55/449 |
| 3,987,862 | 10/1976 | Lidstone .............................. | 55/327 |
| 4,013,137 | 3/1977 | Petersen .............................. | 55/342 |
| 4,014,673 | 3/1977 | Kinnison ............................. | 55/398 |
| 4,159,899 | 7/1979 | Deschenes ........................ | 55/385 B |
| 4,201,557 | 5/1980 | Petersen .............................. | 55/327 |
| 4,285,707 | 8/1981 | Pfenning ............................. | 55/404 |

Primary Examiner—Bernard Nozick

[57] ABSTRACT

An air precleaning device for use in connection with clean air consumption and ventilation purposes such as with internal combustion engines, compressors, and the like and for ventilation such as in a vehicle cab or in clean air quarters generally, the precleaner comprising a directional hood receiving contaminant laden air, having an unrestricted air intake and a short throated directional separation chamber in which contaminants are separated from the incoming air and discharged and a passage directs cleaned air to its intended use.

10 Claims, 6 Drawing Figures

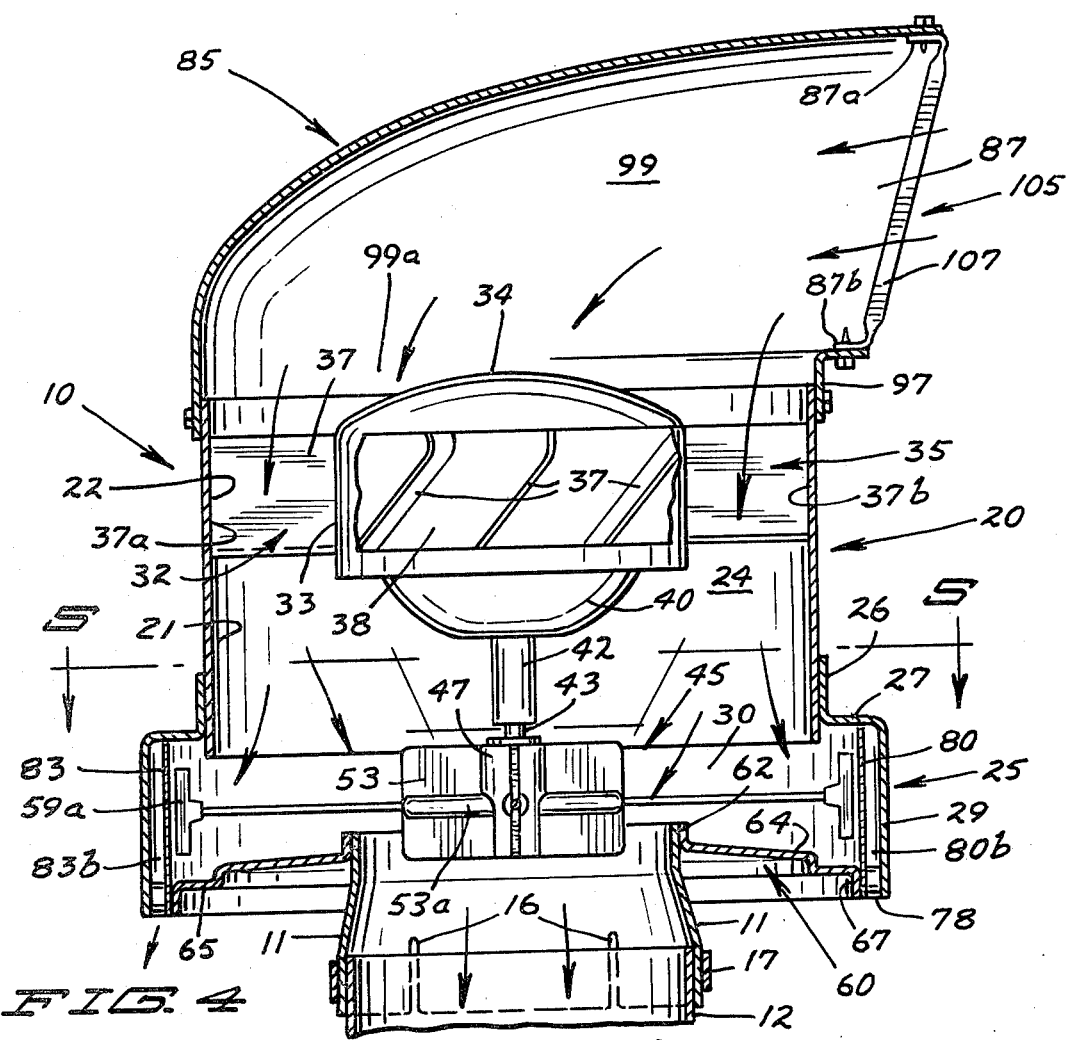
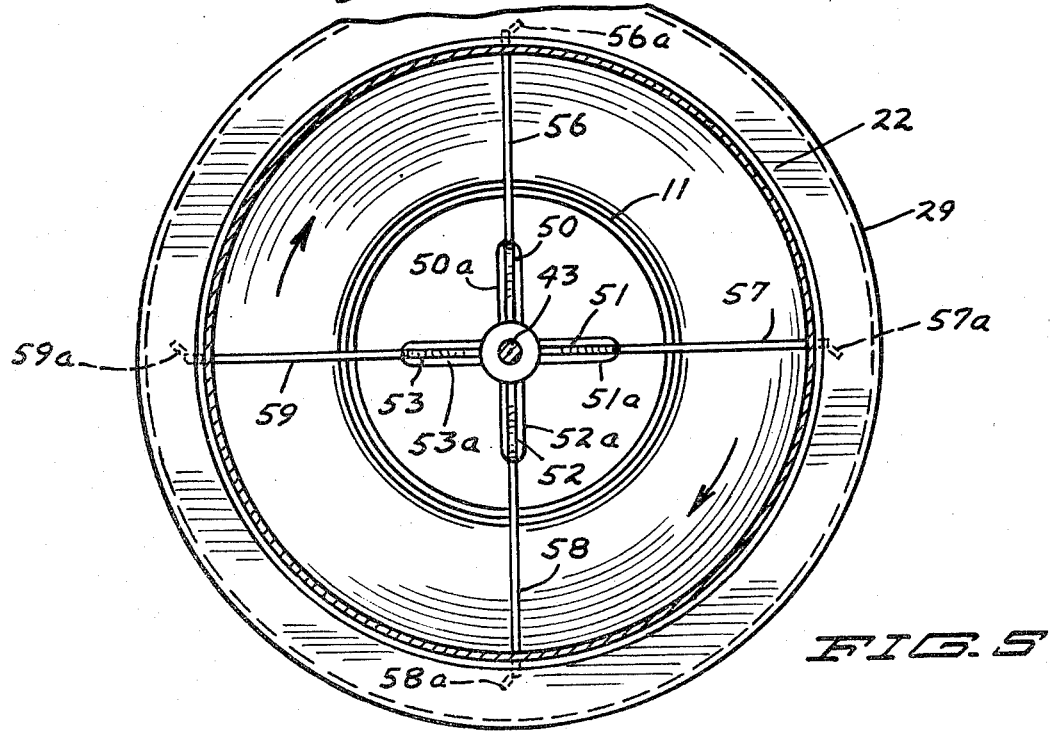

AIR PRECLEANER FOR INTERNAL COMBUSTION ENGINE

BACKGROUND OF THE INVENTION

1. Field of the Invention

This invention relates to an air precleaning device.

2. Description of the Prior Art

The device herein relates to an air precleaning device or air precleaner particularly adapted for clean air consumption and ventilation purposes and as described herein is adapted to be mounted upon the stack of an air inlet such as of an internal combustion engine or a compressor and the like. It is known in the art to provide directional hoods for the intake of air.

However, prior art directional hoods are known to have restricted screened air inlets with the screen member tending to become clogged with contaminants and with air heavily laden with contaminants and with moisture such as in the form of sleet. The restrictions of such devices extend to the intake chamber and the throat portions thereof resulting in the presence of a back pressure which does permit a maximum flow of the air stream through the device.

As in the case of U.S. Pat. No. 3,987,862 to LIDSTONE the hood is directed to face an incoming stream of air utilizing the velocity of the air stream for separation of water from the air stream. No specific means are provided for separation of contaminants.

It is desirable to provide an air precleaning device with an inlet free of tendency to become clogged due to conditions of air and having an air inlet or receiving chamber providing for a relatively short unrestricted passage of the incoming air stream into and through a separation chamber within which means are provided in which the contaminants of the air by a centrifugal action are separated therefrom and discharged to the atmosphere.

SUMMARY OF THE INVENTION

This invention relates to a directional intake hood in connection with an air precleaning device such as to be mounted upon the air inlet passage leading to the air intake of the proposed use of the cleaned air such as for consumption by combustion engines and compressors and the like and for ventilation purposes.

It is an object of this invention to provide an air precleaning device having a directional air intake or hood constructed and arranged to be relatively free of restriction for the passage of an air stream therethrough to the separation chamber of the device wherein contaminants are removed from the incoming air and exhausted to the atmosphere.

It is another object of this invention to provide an air precleaning device for uses herein above indicated wherein said device is constructed and arranged to have a directional air intake, said air intake having means overlying the air inlet thereof which is of such an arrangement as to avoid tendency to restrict the passage of air therethrough and having a throat section of such relative lateral dimensions and of such short length as to provide for unrestricted passage of the incoming air to an adjacent air separation chamber for the removal of the contaminants in the air.

More specifically, it is an object of this invention in connection with the directional hood of an air precleaning device to form the inlet of said hood with a louvered screen arranged to permit the unrestricted passage of air therethrough and which provides direction to the incoming air stream and having in connection therewith a chamber with a throat portion leading to an air separation chamber, said chamber giving centrifugal direction to the air passing therethrough and being of such dimension and arrangement as to avoid causing the tendency of restriction or back pressure of said air.

These and other objects and advantages of the invention will be set forth in the following description made in connection with the accompanying drawings in which like reference characters refer to similar parts throughout the several views.

BRIEF DESCRIPTION OF THE DRAWINGS

FIG. 4 is a view in vertical section on an enlarged scale taken on line 4—4 of FIG. 1 as indicated, and FIG. 5 is a view in horizontal section taken on line 5—5 of FIG. 4 as indicated.

DESCRIPTION OF A PREFERRED EMBODIMENT

Figure 1:
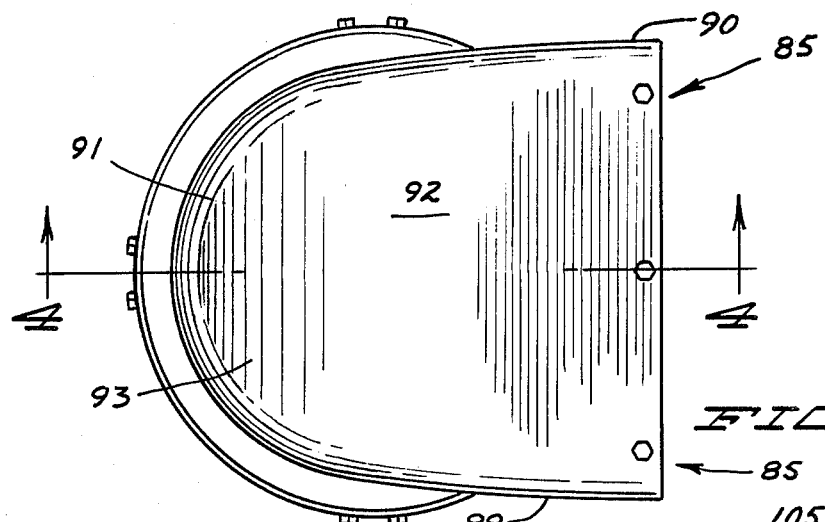
FIG. 1 is a top plan view.

Referring to the drawings, the invention herein comprises an air precleaning device or air precleaner as indicated generally by the reference numeral 10. The embodiment of the invention as described herein relates particularly to the device as providing clean air as for an internal combustion engine or a compressor, this for purpose of illustration and not for limitation.

Figures 2, 2A:
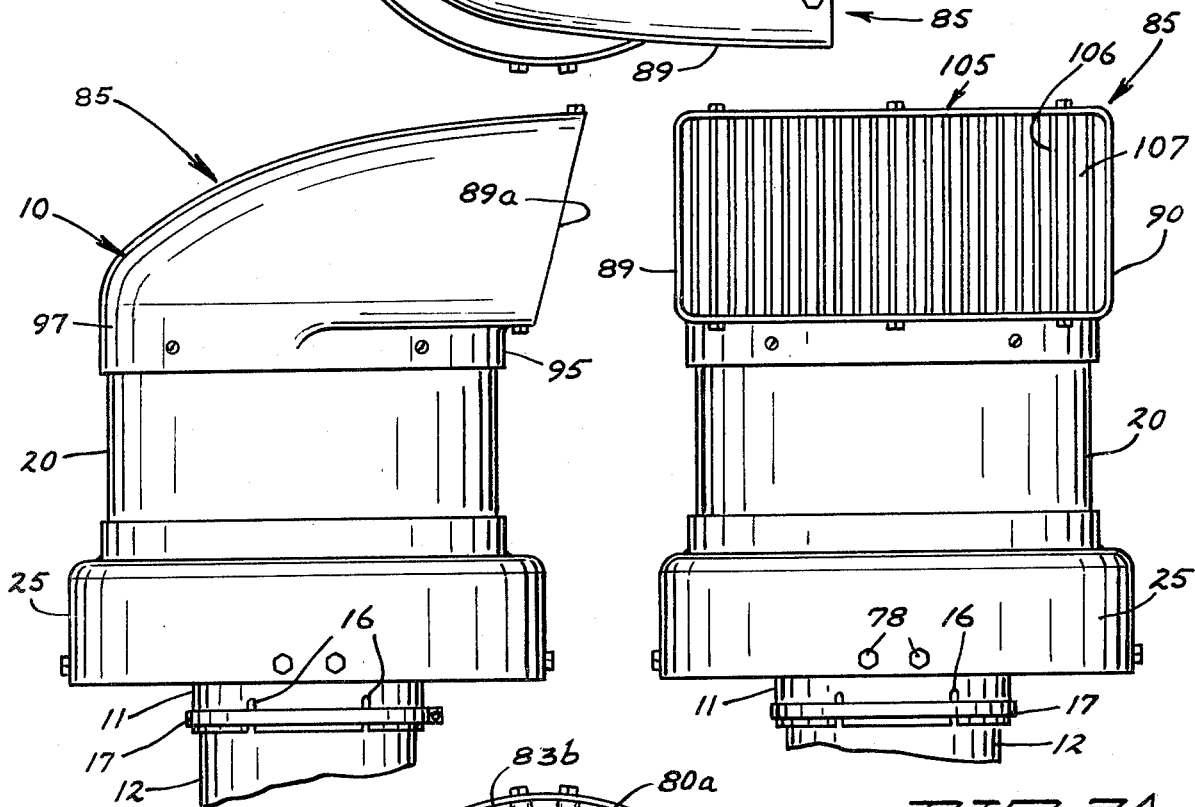
FIG. 2 is a view in side elevation.
FIG. 2a is a view in front elevation.
Figure 3:
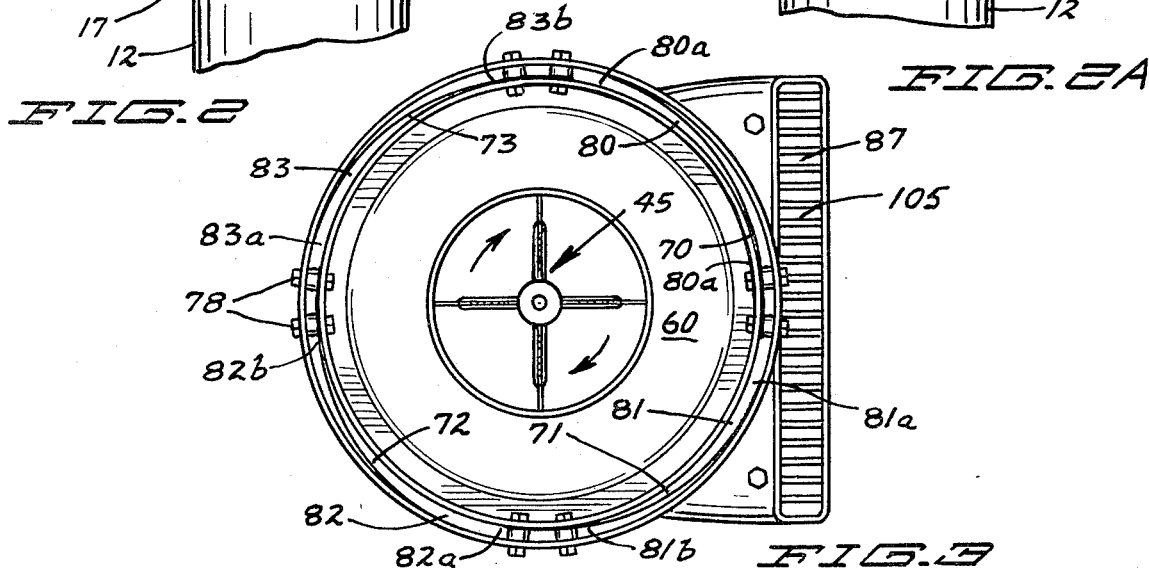
FIG. 3 is a bottom plan view.

In an operating position, said device is shown mounted by means of a sleeve 11 upon a stack 12, as indicated in FIG. 2, which stack forms an air intake pipe which by way of concept may represent the air inlet of a cab or of any enclosed space for ventilation purposes and which by way of illustration is intended to represent the air intake pipe of an internal combustion engine or a compressor for the consumption or use of clean air.

Said sleeve is shown having circumferentially spaced vertical slots 16 therein for compression and a conventional clamp 17 to secure said sleeve to said stack. Said sleeve will be further described.

Referring to FIG. 4, the device herein comprises a cylindrical housing body portion 20 forming a relatively short throat portion and said body portion has depending therefrom an annular skirt portion 25 which has an upwardly extending annular collar 26 receiving therein and being secured thereto as by welding to the lower portion 21 of said housing body portion. Said collar has outwardly projecting thereabout a substantially right angled flange 27 which extends downwardly to form a depending annular or cylindrical portion or skirt 29.

Said housing portion 20 forms therein to its full extent a separation chamber 24. Upwardly centrally of said separation chamber is disposed an inverted bowl assembly or bowl 32 having a side wall 33 and a domed top wall 34 forming a deflective surface. Surrounding said bowl is a vane assembly 35 comprising a plurality of spaced vanes 37, which are secured as by welding at one side 37a thereof to the wall 22 of said housing body portion 20 and at their outer or inner sides 37b, to the side wall 33 of said bowl 32. The vanes shown are representative of all of the vanes.

Said vanes are elongated rectangular plate members in plan and are downwardly angled as indicated in FIG. 4 and are somewhat arcuate in longitudinal section and which taken as a whole, said vanes slope downwardly in a circumferential clockwise direction. Said vanes have therebetween relatively non-restrictive passages 38. Thus an incoming air stream is given direction and is directed into a centrifugal motion immediately upon entering the inlet 87.

Said bowl has a downwardly domed bottom wall 40 and in the particular embodiment here described is shown having secured to the central bottom portion thereof as by welding a cylindrical member forming a bearing 42 which has journaled therein and extending outwardly thereof a shaft 43 which carries a rotatable impeller or spinner assembly as indicated at 45, said shaft includes a hub 47 secured in a conventional manner and which has disposed thereabout spaced at 90° intervals, as shown in FIGS. 4 and 5, upright substantially rectangular blades 50-53. Said hub and blades may be unitarily molded and the same may include the shaft 43. Said impeller assembly may be otherwise mounted to spin about a central vertical axis relative to said bowl 32.

Extending outwardly from each of said blades are rods or arms 56-59, each of which respectively may be received within and secured to central horizontal rib portions 50a-53a of said blades 50-53. Carried at the end of each of said arms is a scoop-like paddle indicated at 56a-59a. Said blades in spinning define a path surrounded by said skirt 29 spaced outwardly of said path. The chamber 30 formed within said skirt 29 will be referred to as a discharge or exhaust chamber.

Forming a bottom wall for said chamber 30 is a disklike plate member 60 having a central annular flange 62 surrounding the inner upper rim portion of said sleeve 11 and being secured thereto as by welding. Said plate member has a downwardly directed body portion 64 with a stepped down annular portion 65 having a right angled depending terminal flange 67, said flange being spaced inwardly of said skirt 29 and is attached thereto by a plurality of nut and bolt spacer assemblies 78.

Secured by said nut and bolt spacer assemblies adjacent said flange 67 and spaced inwardly from said skirt 29 and outwardly of said paddles 56a-59a are a plurality of arcuate horizontally disposed elongated discharge guideplate members 70-73 substantially the height of said skirt and being spaced equally circumferentially within said skirt to form elongated longitudinally tapered open bottom outlet discharge passage 80-83 between the flange 67 and the skirt 21. Each of said guide plate members is positioned to have a discharge inlet at its forward end as at 80a-83a and each extends rearwardly tangentially to said skirt 21 to be secured thereto and spaced from said flange to form end walls of said discharge passages as at 80b-83b as indicated in FIG. 4.

The spinning or centrifuging action of said blades 50-53 and of said paddles 56a-59a accelerates the centrifugal movement of the incoming air stream caused by the vanes 37 and causes the foreign particles or contaminants in the incoming air stream to be thrust outwardly towards the periphery of said chamber 30 and into said discharge passages to be discharged to the atmosphere and the thus cleaned air moves directly through the sleeve 11 and stack 12 to the air intake or air cleaner of the engine.

The separation chamber 24 is the full width of the diameter of said housing member 20. Mounted upon said housing member is a hood member 85 having an inlet opening 87, side walls 89 and 90, a back wall 91 and a top wall 92.

As shown, said hood is squat and has a relatively large full height inlet 87, said inlet has a width greater than the diameter of said body portion 20 and is here shown to be rectangular in front elevation and having an upward forward slope as indicated by the leading edge 89a of the side wall 89 and as indicated in section by the inlet opening in FIG. 4. Said side walls taper and curve sloping downwardly and rearwardly to form the back wall 91 which conforms downwardly to the adjacent curvature of said body portion 20. A top wall 92 extends from said inlet and slopes downwardly gradually rearwardly to merge with said side walls as at 93. A short bottom wall 95 is formed under said inlet 87, which bottom wall and the adjacent depending portion of said side walls are formed into an annular depending collar or flange 97 which fits over the top of said body portion 20 and is secured thereto as by metal screws. Within said hood is an inlet chamber 99.

Disposed into said inlet 87 as the front wall thereof and having upper and lower right angled flange portions 87a and 87b extending within said inlet to be suitably secured as by metal screws is a screen member 105. Said screen member is formed to have full height louvers 106 having louver openings 107, said louvers being disposed at a sufficient angle in horizontal section to form an effectively angled deflective surface.

A salient element in the structure of said hood is the full width of the inlet 87 and the short throat 99a of the inlet chamber 99 including the short length of the body portion 20 which provides free unrestricted passage for incoming air to enter into and pass through said vane assembly 35 and said hood has been formed to be relatively free from causing any back pressure. The entire housing in being of a short height provides a relatively short path of air flow for the separation and discharge of contaminants.

With regard to the baffles of the inlet screen and the vane assembly, incoming air is directed immediately into a directional motion to discharge its contaminants. If the hood is turned face upstream or into the wind, the force of the wind creates a ram effect upon the incoming air stream to accelerate the contaminant discharging process. This action is enhanced by the relatively wide dimension of the device and the freedom from restriction with which air moves therethrough.

The device herein is very efficient and successful in handling large quantities of air whether facing into the ram effect of a windborne air stream or whether facing in a downstream direction.

Thus the device as described provides contaminant free air for any desired use with the entry of the air stream being through a controlled access, controlled in that all of the incoming air passes through the device herein.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:
1. An air precleaning device, having in combination a substantially cylindrical housing, a directional hood structure carried by said housing having a chamber therein to the full extent thereof, said hood having a relatively large inlet, a louvered member forming said inlet, a separation chamber within said housing underlying said hood structure, an unrestricted passage between said chamber and said separation chamber, a discharge chamber within said housing underlying said separation chamber, a vane assembly carried by said housing disposed within said separation chamber centrifuging the air stream passing through said housing, means forming a plurality of contaminant discharge passages at the periphery of said discharge chamber, an impeller assembly disposed within said discharge chamber, means within said housing securing said impeller assembly, and means carried by said impeller assembly discharging contaminants from said air stream to said discharge passages.

2. The structure set forth in claim 1, wherein said louvered member being substantially rectangular in front elevation, and the louvers of said member being spaced to provide relatively unrestricted passage of air therebetween.

3. The structure set forth in claim 1, wherein said inlet has a width greater than the diameter of said housing.

4. The structure set forth in claim 1, wherein the louvers of said inlet having such a width and such an angle to the horizontal as to deflect an incoming air stream causing the same to have a centrifugal action.

5. The structure set forth in claim 1, wherein said inlet has a width greater than the diameter of said housing, said chamber has a throat portion leading into said separation chamber through said vane assembly, and said throat portion has a curvature such as not to cause a restriction on the passage of air therethrough.

6. The structure of claim 1, wherein said housing is formed as a unitary continuous structure.

7. The structure of claim 1, wherein the forward portion of said hood is substantially rectangular in cross section gradually merging rearwardly into the curvature of said housing to form therewith a short unrestrictive throat portion.

8. The structure of claim 1, wherein said discharge chamber comprises a deflective dome structure, a plurality of vanes spaced about said dome structure interconnecting said dome structure with said housing, said vanes being angled downwardly in a circumferential clockwise direction, and said vanes being sufficiently spaced apart to form relatively non-restrictive passages therebetween.

9. The structure of claim 8, wherein said impeller assembly comprises a shaft depending axially of said dome structure, a hub journaled on the lower portion of said shaft, a plurality of vertically disposed blades integral with said hub and spaced circumferentially thereabout, arms extending outwardly respectively of said blades, paddles respectively carried by said arms at the ends thereof, and said arms and paddles extending to adjacent the housing thereabout.

10. An air precleaning device, having in combination a substantially cylindrical housing, a directional hood structure carried by said housing having a chamber therein to the full extent thereof, said hood having a relatively large louvered inlet, the louvers of said inlet being angled to centrifuge the air stream entering therethrough, a separation chamber underlying said hood in unrestricted communication with said first mentioned chamber, a discharge chamber within said housing having unrestricted communication with said separation chamber, a vane assembly disposed within said separation chamber, said vane assembly comprising a dome structure, a plurality of vanes circumferentially disposed about said dome structure interconnecting the same with said housing, said vanes being angled downwardly clockwise about said dome structure and being spaced sufficiently apart to form relatively non-restrictive passages therebetween, means forming a plurality of contaminant discharge passages to the periphery of said discharge chamber, an impeller assembly disposed within said discharge chamber, said impeller assembly comprising a shaft depending from said dome structure axially thereof, a hub carried by said shaft journaled at the lower end portion thereof, a plurality of vertically disposed blade members spaced about said hub portion, said blade members respectively having arms extending outwardly thereof, a scoop member carried at the end of each of said arms, means forming a plurality of contaminant discharge passages at the periphery of said discharge chamber, said arms extending outwardly to have said scoop members define a path closely adjacent said discharge passages, and said blades and said scoop members further centrifuging said air stream within said discharge chamber to exhaust contaminants of said air stream through said discharge passages to the atmosphere.

* * * * *